United States Patent [19]

McShane

[11] Patent Number: 4,664,925

[45] Date of Patent: May 12, 1987

[54] DYED EGGS

[75] Inventor: James E. McShane, Memphis, Tenn.

[73] Assignee: Plough, Inc., Memphis, Tenn.

[21] Appl. No.: 710,740

[22] Filed: Mar. 11, 1985

[51] Int. Cl.[4] .......................... A23L 1/275; A23L 1/32
[52] U.S. Cl. ..................................... 426/250; 426/614;
426/104; 426/801; 426/298; 8/8
[58] Field of Search ............... 426/250, 540, 614, 383,
426/104, 801, 289, 298; 8/8

[56] References Cited

U.S. PATENT DOCUMENTS

| | | | |
|---|---|---|---|
| 2,593,566 | 4/1952 | Kamp | 426/540 |
| 4,139,645 | 2/1979 | Werner | 426/540 |
| 4,165,390 | 8/1979 | Saladini | 426/540 |
| 4,181,745 | 1/1980 | Growe et al. | 426/614 |
| 4,371,555 | 2/1983 | Tully | 426/614 |

*Primary Examiner*—Jeanette Hunter
*Attorney, Agent, or Firm*—Gerald S. Rosen; Thomas D. Hoffman; Stephen I. Miller

[57] ABSTRACT

A means and compositions for pretreating whole intact eggs in a boiling solution at about pH 3.2-3.6 with a buffer, preferably cream of tarter, prior to dyeing and coating with a flavor fragrance.

A kit for consumer use in treating, dyeing and adding a flavor fragrance is also disclosed.

14 Claims, No Drawings

DYED EGGS

BACKGROUND OF INVENTION

This invention relates to a method of treating intact eggs to enhance their dyeability. In addition, this invention relates to a means of imparting a flavor fragrance to such treated, dyed eggs, the treated eggs and a kit for use in treating, dyeing and imparting a flavor fragrance to the eggs.

Eggs generally are dyed for decorative purposes, usually as colored Easter eggs intended primarily for use by children. For many years, such eggs have been dyed by dipping them in water containing a water-soluble dye. The dye is usually placed in the water as a tablet or powder. Although this has been an accepted practice for many years, the results of the dyeing are not always satisfactory since many times the dyes do not adhere evenly to the eggs or produce good color. In addition, no successful methods have been developed which permit one to not only dye eggs but also to make them more attractive to children by imparting a flavor fragrance to them.

SUMMARY

This invention provides a method treating eggs to make them more amenable to dyeing eggs, and if desired, imparting a flavor fragrance to them. In addition, this invention provides a kit suitable for use when treating and dyeing the eggs and imparting flavor fragrance to them.

The method involves three steps in its preferred mode:

1. Pretreating the eggs in a boiling aqueous solution of a buffer at about pH 3.2–3.6;
2. Dipping the pretreated eggs, while wet, after cooling, into an aqueous dye solution containing, if desired, an oily flavor fragrance and then;
3. Removing the dyed egg also coated with the flavor fragrance, if present, and allowing to dry.

The kit of this invention comprises a package of (a) a buffer, e.g. cream of tartar powder, in a first vial of packet and (b) a dye-flavor fragrance powder in a second vial or packet.

DETAILED DESCRIPTION

The method of this invention in its first step is a pretreatment of eggs (as used herein, "eggs" means intact, unbroken eggs, preferably chicken eggs) to prepare the outside surface of the eggshell to receive dyes and flavor fragrances, i.e., enhance their dye-ability.

This step is accomplished by boiling an aqueous buffer solution at about pH 3.2–3.6, preferably about pH 3.5, having the egg therein. The pH of the acidic medium is controlled by a suitable food grade buffer such as potassium bitartrate (cream of tartar), potassium acid phosphate and dilute HCl, glycine and HCl, citrate and HCl, and the like. The preferred buffer is potassium bitartrate.

The dilution of buffering agent used in the method of this invention is sufficient of provide a pH of about 3.2–3.6, preferably about pH 3.5, e.g., 2 grams of cream of tartar per liter of water.

The eggs to be treated are placed in the water which is then heated to boiling and allowed to stand covered for about 20 minutes. The eggs are then cooled to room temperature either by letting them stand or by rinsing them off with cold water.

The above described treatment has several beneficial effects, (a) it conditions the eggshell so that, when dyed with a water soluble dye, the dye is uniformly distributed on the surface thereof, (b) it enables dyes whose color development on the egg was previously poor to have enhanced and true color, e.g., F.D. & C. Red #40, F.D. & C. Blues #1 and #2. It also causes increases in the intensity of other colors, and (c) it enables flavor fragrances to adhere to the dyed eggs.

In the second step of the method of this invention, the treated egg is dipped into an aqueous solution of the desired dye and held there for a sufficient time to dye the egg, usually about 2 or 3 minutes. If it is desired, a flavor fragrance can be added, although water soluble flavor fragrances or encapsulated flavor fragrances can be used, it is preferred to use those which are essentially water insoluble and have a specific gravity less than water for incorporation into the dye solution. The preferred flavor fragrances, being lighter than water, then float on top of the dye-water solution.

In a preferred embodiment, the treated egg, while still wet, although use of dry eggs is possible, is immersed in the water containing dye and, if desired, flavor fragrance. Some of the oil layer of flavor fragrance, if present, envelopes the egg as it is dipped, but because the egg is wet, the flavor fragrance does not remain on the egg but separates in the aqueous dye solution and rises to its surface.

In the third step of the method of this invention, the dyed egg is removed from the aqueous dye solution and the oil layer of flavor fragrance adheres to the egg as it is removed and dried. The flavor fragrance is not separated from the dyed egg during drying because it is not in water. In cases where the flavor fragrance is not water-insoluble or is encapsulated, it could coat the egg with the dye without deleteriously affecting the dye color or distribution on the egg surface.

In a less preferred embodiment contemplated by this invention, the egg is dyed, then redipped after drying, to obtain the flavor fragrance.

The dye compositions used to dye the eggs are a powder containing the dye or mixtures of dyes, a particulate carrier, e.g., sugar, and a buffer to maintain the pH of the dye solution at an optimum level for the dye or mixtures of dyes being used. In addition, if a flavor fragrance is desired, it is incorporated into the dye composition which remains a powder. The amount of flavor fragrance or mixtures of flavor fragrances used depends on their identity, however, generally from about 6% to 10% by weight is satisfactory.

The dyes used are the water-soluble dyes conventionally used to color Easter eggs or to decorate eggs. In addition, this invention enables some water-soluble dyes, e.g., F.D. & C. Red #40 to be used where before their color was unsatisfactory for dyeing eggs. Some of the conventional colors used are a combination of F.D. & C. Red #40, F.D. & C. Yellow #5 and F.D. & C. Blue #2 to achieve a brown color; F.D. & C. Yellow #5 and F.D. & C. Red #40 to achieve an orange color; F.D. & C. Yellow #5; F.D. & C. Blue #1 and F.D. & C. Blue #2; F.D. & C. Yellow #5; F.D. & C. Blue #1 and F.D. & C. Blue #2; F.D. & C. Red #40 and; F.D. & C. Blue #1 and F.D. & C. Yellow #5 to achieve a chartreuse color. Other colors and combinations of colors known to the art are also suitable. The specific colors used are not critical to the invention, although some colors are used to color eggs satisfactorily for the first time as a result of this invention. The amount of dye or mixtures of dyes used in the powder compositions useful in this invention depend on the particular dye or mixtures of dyes and the color desired. Generally, the amounts vary from about 0.3% to about 10% by weight.

The flavor fragrances or mixtures of flavor fragrances suitable for use in this invention are those conventionally used to impart flavor or fragrance to food, e.g., a combination of chocolate and chocolate cake for a chocolate fragrance; orange for an orange fragrance; banana for a banana fragrance; bubblegum for a bubblegum fragrance; strawberry for a strawberry fragrance and; peppermint for a peppermint fragrance. The specific flavor fragrance is not critical to the invention. The flavor fragrances in the preferred embodiments of this invention must be essentially water-insoluble and have a specific gravity of less than 1, i.e., they must float on water, however, in other embodiments they can be water-soluble or encapsulated.

The carrier for the dye-flavor fragrance composition should be inert to the other components of the composition and in particulate form. Preferred for use in this invention is fine granular sugar. Other particulate materials which are equally suitable are, e.g., precipitated or fumed silica, lactose, and sorbitol.

The buffer compositions used in the dye compositions should be such that they maintain the pH of the dye solution at a level which is optimum for the dyes involved. This varies from dye to dye, but is usually between about pH 2.9 and pH 3.7. A preferred buffer composition is monocalcium phosphate and tartaric acid. The preferred buffer components are used in a ratio, on a weight basis, of about 2 to 7 parts phosphate per part tartaric acid, depending on the pH needed. In some instances it is possible to use either the phosphate buffer or the tartaric acid buffer alone.

The following examples illustrate the invention. In each example chicken eggs purchased at a local grocery store are used.

EXAMPLE 1

Pretreatment 2 grams of cream of tartar are dissolved in 1 liter of water. The resulting pH of the solution is 3.55. Eggs to be subsequently dyed are placed in the treating solution which is then brought to a boil. The eggs are kept in the boiling solution for about three minutes, then removed, and washed with cold water. The cooled, washed eggs are then dipped, while still wet, into a dye or dye-flavor fragrance solution for about 1 to 3 minutes, then removed and allowed to dry.

EXAMPLE 2

Dye-Fragrance Treatment

Eggs treated according to Example 1 were dipped, while wet, into the following dye-flavor fragrance compositions for the times noted.

(a) Red—strawberry composition

| Ingredient | % w/w |
| --- | --- |
| Fine Granular Sugar | 61.00 |
| Monocalcium Phosphate | 15.50 |
| Tartaric Acid | 3.50 |
| F.D. & C. Red #40 | 10.00 |
| Strawberry Fragrance | 10.00 |
| | 100.00 |

Procedure

Weigh out the sugar, monocalcium phosphate, tartaric acid and red dye into a jar and shake vigorously to blend the powders. Add the strawberry flavor and mix until well blended, then shake vigorously. Dissolve 2 grams of the red—strawberry composition in 150 ml. of tap water, the resulting pH is 3.55. Dip 3 wet eggs (one at a time), treated as in Example 1, into the dye-fragrance solution for 3 minutes each then evaluate the color and fragrance. The results are shown in the Table. The pH of the dye solution after dyeing the three eggs is 3.57.

(b) Brown—chocolate composition

| Ingredient | % w/w |
| --- | --- |
| Fine Granular Sugar | 61.74 |
| Monocalcium phosphate | 22.50 |
| Tartaric acid | 3.60 |
| F.D. & C. Red #40 | 3.19 |
| F.D. & C. Yellow #5 | 2.12 |
| F.D. & C. Blue #2 | 0.85 |
| Chocolate Fragrance | 4.40 |
| Chocolate Cake Fragrance | 1.60 |
| | 100.00 |

Prepare the composition powder as in part (a) herein and add 2 grams to 150 ml. water. The initial pH is 3.36. Dip one wet egg treated as in Example 1 into the solution for 3 minutes, remove and allow to dry. Evaluate the color and fragrance. The results are in the Table.

Dip 3 more wet eggs treated (as in Example 1), one at a time, for 3 minutes each into the same solution, remove and allow to dry. Evaluate the color and fragrance. The results are in the Table. The beginning pH of the dye solution was 3.38 and the final pH was 3.54.

(c) Orange—orange composition

| Ingredient | % w/w |
| --- | --- |
| Fine Granular Sugar | 69.57 |
| Monocalcium phosphate | 10.22 |
| Tartaric Acid | 3.98 |
| F.D. & C. Yellow #5 | 5.63 |
| F.D. & C. Red #40 | 0.60 |
| Orange Fragrance | 10.00 |
| | 100.00 |

Prepare the composition powder as in part (a) then add 2 grams to 150 ml. water. The initial pH is 3.26. Dip a wet egg treated as in Example 1, into the solution for three minutes, remove and allow to dry. Evaluate the color and fragrance. The results are in the Table.

Dip 3 more wet eggs, treated as in Example 1, one at a time, into the dye-flavor fragrance solution, for three minutes each, remove and allow to dry. The initial pH is 3.27 and the pH after dyeing is 3.33. Evaluate the color and fragrance. The results are in the Table.

(d) Yellow—banana composition

| Ingredients | % w/w |
| --- | --- |
| Fine Granular Sugar | 70.14 |
| Monocalcium phosphate | 10.00 |

-continued

| Ingredients | % w/w |
|---|---|
| Tartaric Acid | 4.00 |
| F.D. & C. Yellow #5 | 5.86 |
| Banana Fragrance | 10.00 |
| | 100.00 |

Prepare the composition powder as in part (a) then add 2 grams to 150 ml. water. The initial pH is 3.10. Dip 3 wet eggs treated as in Example 1, one at a time, into the resulting solution for three minutes each, remove and allow to dry. The pH after drying is 3.2. Evaluate the color and fragrance. The results are in the Table.

(e) Blue—bubblegum composition

| Ingredients | % w/w |
|---|---|
| Fine Granular Sugar | 82.60 |
| Tartaric Acid | 4.00 |
| F.D. & C. Blue #1 | 2.80 |
| F.D. & C. Blue #2 | 0.60 |
| Bubblegum Fragrance | 10.00 |
| | 100.00 |

Prepare the composition powder as in part (a) then add 2 grams to 150 ml. water. The initial pH is 2.91. Dip 3 wet eggs, treated as in Example 1, one at a time, into the resulting solution for three minutes each, remove and allow to dry. The pH after dyeing is 3.08. Evaluate the color and fragrance. The results are in the Table.

(f) Chartreuse—peppermint composition

| Ingredients | % w/w |
|---|---|
| Fine Granular Sugar | 54.25 |
| Monocalcium phosphate | 25.00 |
| Tartaric Acid | 4.00 |
| F.D. & C. Blue #1 | 0.37 |
| F.D. & C. Yellow #5 | 6.38 |
| Peppermint Fragrance | 10.00 |
| | 100.00 |

Prepare the composition powder as in part (a) then add 2 grams to 150 ml. water. The initial pH is 3.41. Dip a wet egg, treated as in Example 1, into the solution for three minutes, remove and allow to dry. Evaluate the color and fragrance. The results are in the Table.

Dip 3 more wet eggs, treated as in Example 1, one at a time, into the dye-fragrance solution for three minutes each, remove and allow to dry. The initial pH is 3.41 and the pH after dyeing is 3.52. Evaluate the color and fragrance. The results are in the Table.

In the above Examples, the powder compositions can be modified by replacing equivalent amounts of one fragrance by another fragrance, for example, the banana fragrance can be replaced by e.g., orange fragrance.

In addition, the powder compositions can be made without the fragrance, in which case the eggs are only dyed after the pretreatment.

EXAMPLE 3

Egg Dyeing Kit 2 grams of cream of tartar are placed in an aluminum foil pouch. The pouch is then sealed. 2 grams of a powder composition of Example 2 are placed in an aluminum foil pouch. The pouch is then sealed. The pouch containing the cream of tartar and the pouch containing the powder composition are packed in a single package containing instructions for use.

The following Table shows the results of the evaluation of the color and fragrance on the eggs according to the Examples. The numeral 3 indicates an excellent rating the numeral 2 indicates a good rating and the numeral 1 indicates a fair rating.

TABLE

| | | Fragrance Time of Observation/hrs. | |
|---|---|---|---|
| Example | Color | 0 | 24 |
| 2 (a) | Brilliant red, evenly dyed | | |
| egg 1 | | 3 | 2 |
| egg 2 | | 2 | 2 |
| egg 3 | | 2 | 1 |
| 2 (b) | Deep dark chocolate, fairly even | | |
| egg 1 | | 2+ | 2 |
| egg 2 | | 2 | 1 |
| egg 3 | | 2 | 1 |
| egg 4 | | 2 | 1 |
| 2 (c) | Orange, evenly dyed | | |
| egg 1 | | 3 | 2 |
| egg 2 | | 2 | 1 |
| egg 3 | | 3 | 2 |
| egg 4 | | 3 | 1 |
| 2 (d) | Deep yellow, evenly dyed | | |
| egg 1 | | 3 | 2 |
| egg 2 | | 3 | 2 |
| egg 3 | | 3 | 2 |
| 2 (e) | Brilliant dark blue, evenly dyed | | |
| egg 1 | | 3 | 3 |
| egg 2 | | 3+ | 2+ |
| egg 3 | | 3 | 2 |
| egg 4 | | 3+ | 2+ |
| 2 (f) | Green, evenly dyed | | |
| egg 1 | | 3 | 2 |
| egg 2 | | 3 | 2 |
| egg 3 | | 3 | 2 |
| egg 4 | | 3 | 2 |

The data in the Table shows that the eggs were evenly dyed with good color and maintained their fragrances satisfactorily. Generally, in the case of Easter eggs, the need for fragrance maintenance is not greater than one or two days.

I claim:

1. A method of dyeing an egg which comprises:
   (a) Cooking by boiling an egg in a buffered aqueous solution of cream of tartar at a concentration of about 2 grams per liter of water at a pH of about 3.2 to 3.6, then removing the egg from the solution;
   (b) Cooling the boiled egg with cold water;
   (c) Dipping the cool egg while still wet into an aqueous dye solution containing a flavor fragrance or mixture of flavor fragrances buffered at a pH of about 2.9 to 3.7 with a buffer comprising tartaric acid; and
   (d) Removing the egg from the dye solution and allowing it to dry at ambient conditions.

2. The method of claim 1 wherein the flavor fragrance is oily and essentially water insoluble.

3. The method of claim 1 wherein the dye is F.D. & C. Red #40.

4. The method of claim 1 wherein the dye is a mixture of F.D. & C. Red #40, F.D. & C Yellow #5, F.D. & C. Blue #2.

5. The method of claim 1 wherein the dye is a mixture of F.D. & C. Yellow #5 and F.D. & C. Red #40.

6. The method of claim 1 wherein the dye is F.D. & C. Yellow #5.

7. The method of claim 1 wherein the dye is a mixture of F.D. & C. Blue #1 and F.D. & C. Blue #2.

8. The method of claim 1 wherein the dye is a mixture of F.D. & C. Blue #1 and F.D. & C. Yellow #5.

9. The method of claim 2 wherein the flavor fragrance is a mixture of chocolate fragrance and chocolate cake fragrance.

10. The method of claim 2 wherein the flavor fragrance is an orange fragrance.

11. The method of claim 2 wherein the flavor fragrance is a banana fragrance.

12. The method of claim 2 wherein the flavor fragrance is a bubblegum fragrance.

13. The method of claim 2 wherein the flavor fragrance is strawberry fragrance.

14. The method of claim 2 wherein the flavor fragrance is a peppermint fragrance.

* * * * *